United States Patent
Cable et al.

(10) Patent No.: US 9,989,749 B2
(45) Date of Patent: *Jun. 5, 2018

(54) MICROSCOPY SYSTEM WITH AUTO-FOCUS ADJUSTMENT BY LOW-COHERENCE INTERFEROMETRY

(71) Applicant: Thorlabs, Inc., Newton, NJ (US)

(72) Inventors: Alex Cable, Newton, NJ (US); Jörn Wollenzin, Lübeck (DE); Ross Johnstone, Oak Hill, VA (US); Kirk Gossage, Austin, TX (US); Jeffrey S. Brooker, Oak Hill, VA (US); Jason Mills, Austin, TX (US); James Jiang, Hackettstown, NJ (US); Dierck Hillmann, Lübeck (DE)

(73) Assignee: Thorlabs, Inc., Newton, NJ (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/680,962

(22) Filed: Aug. 18, 2017

(65) Prior Publication Data

US 2017/0343787 A1 Nov. 30, 2017

Related U.S. Application Data

(63) Continuation of application No. 14/994,835, filed on Jan. 13, 2016, now Pat. No. 9,869,852.

(Continued)

(51) Int. Cl.
*G02B 21/24* (2006.01)
*G02B 7/28* (2006.01)
(Continued)

(52) U.S. Cl.
CPC ......... *G02B 21/245* (2013.01); *G01B 9/0209* (2013.01); *G01B 9/02059* (2013.01);
(Continued)

(58) Field of Classification Search
CPC .... G02B 21/245; G02B 7/28; G02B 21/0004; G02B 21/26; G02B 21/08; G02B 21/248;
(Continued)

(56) References Cited

U.S. PATENT DOCUMENTS 5,493,109 A 2/1996 Wei et al.
5,982,534 A * 11/1999 Pinkel ................ G01N 21/6458
359/387

(Continued)

FOREIGN PATENT DOCUMENTS

EP 1644697 A2 4/2006
WO 2012016753 A1 2/2012

OTHER PUBLICATIONS

International Preliminary Report on Patentability dated Aug. 10, 2017 in corresponding International Application No. PCT/US/2016/013228.

(Continued)

*Primary Examiner* — Frank Font
(74) *Attorney, Agent, or Firm* — Myers Wolin, LLC (57) ABSTRACT

Disclosed are several technical approaches of using low coherence interferometry techniques to create an autofocus apparatus for optical microscopy. These approaches allow automatic focusing on thin structures that are positioned closely to reflective surfaces and behind refractive material like a cover slip, and automated adjustment of focus position into the sample region without disturbance from reflection off adjacent surfaces. The measurement offset induced by refraction of material that covers the sample is compensated for. Proposed are techniques of an instrument that allows the automatic interchange of imaging objectives in a low coherence interferometry autofocus system, which is of major interest in combination with TDI (time delay integration) imaging, confocal and two-photon fluorescence microscopy.

18 Claims, 9 Drawing Sheets

Related U.S. Application Data (60) Provisional application No. 62/107,675, filed on Jan. 26, 2015.

(51) Int. Cl.
*G01B 9/02* (2006.01)
*G02B 21/00* (2006.01)
*G02B 21/26* (2006.01)

(52) U.S. Cl.
CPC ..... *G01B 9/02063* (2013.01); *G01B 9/02077* (2013.01); *G02B 7/28* (2013.01); *G02B 21/0004* (2013.01); *G02B 21/26* (2013.01)

(58) Field of Classification Search
CPC .. G02B 5/12; G01B 9/02059; G01B 9/02063; G01B 9/02077; G01B 9/0209
USPC ....... 359/370, 379, 380, 382, 383, 396, 900; 356/479, 497
See application file for complete search history.

(56) References Cited

U.S. PATENT DOCUMENTS

| | | | |
|---|---|---|---|
| 6,256,102 B1 | 7/2001 | Dogariu | |
| 7,493,227 B2 * | 2/2009 | Ozcan | A61B 5/0066 356/497 |
| 7,652,772 B2 * | 1/2010 | Backman | G01J 3/02 356/497 |
| 2004/0239943 A1 | 12/2004 | Izatt et al. | |
| 2006/0033933 A1 | 2/2006 | Feierabend et al. | |
| 2008/0180685 A1 | 7/2008 | De Lega et al. | |
| 2009/0086216 A1 | 4/2009 | Marks et al. | |
| 2010/0128276 A1 * | 5/2010 | De Groot | G01B 11/2441 356/450 |
| 2010/0128283 A1 | 5/2010 | Liesener et al. | |
| 2010/0302550 A1 * | 12/2010 | Hacker | A61B 3/1005 356/479 |
| 2012/0140243 A1 | 6/2012 | Colonna De Lega | |
| 2014/0168637 A1 | 6/2014 | Wan et al. | |

OTHER PUBLICATIONS

USPTO Ex Parte Quayle Office Action, dated May 18, 2017, for corresponding U.S. Appl. No. 14/994,835.

International Search Report with Written Opinion, dated Apr. 28, 2016, for corresponding international application PCT/US/2016/013228.

* cited by examiner

MICROSCOPY SYSTEM WITH AUTO-FOCUS ADJUSTMENT BY LOW-COHERENCE INTERFEROMETRY

CROSS-REFERENCE TO RELATED APPLICATIONS

This application is a continuation of U.S. patent application Ser. No. 14/994,835 filed on Jan. 13, 2016, which claims the benefit of U.S. Provisional Application No. 62/107,675 filed on Jan. 26, 2015. The contents of U.S. patent application Ser. No. 14/994,835 and U.S. Provisional Application No. 62/107,675 are herein incorporated by reference.

FIELD OF THE INVENTION

The invention generally relates to microscopy. More particularly, the invention relates to a microscopy system with auto-focus adjustment by low-coherence interferometry.

BACKGROUND

For many confocal, two-photon and TDI scanning microscopes, a very fast autofocus procedure is required. This fast procedure needs to function properly in combination with large imaging objective numerical apertures (>0.5) and with samples material that is located underneath a reflective surface, for instance, sliced tissue as used in histology.

In the existing technologies, several approaches for autofocusing are known. The majority of these are based on special frequency analysis of an image taken from the sample by use of an imaging camera. This approach is limited with respect to response speed, as they are based on iterative optimization to set the focus into the sample. In the applications of well plate inspection and large area slide scanning using TDI (time delay integration) imaging, very short response times of the autofocus device are demanded. The technique of special frequency analysis is the limiting factor in optimizing the speed of these imaging problems.

Alternative technologies, like triangulation or patterned illumination analysis, use a much simpler and faster approach. The drawback of these is that they are highly sensitive to signal disturbance that is caused by reflective surfaces located close to the sample to be imaged.

Using low coherence interferometry for determining the location of a sample, leading to a focus adjustment, has been proposed earlier (U.S. Pat. No. 5,493,109). The proposed fashion is not sufficient to solve the problems of high precision (focusing repeatability<1 µm in the optical axis) and reflection sensitivity (when imaging through a glass surface). The reason for these problems is that the proposed setup is utilizing a Michelson type interferometer where the interferometer arms are significantly separated locally and partially guided through a fiber. This approach is subject to thermally and mechanically induced changes to the optical path length of one interferometer arm with respect to the other. Holding a repeatability of <1 µm in the proposed system has shown to be impossible. The target application of this is for surgical ophthalmic OCT (optical coherence interferometry) that does not require such large repeatability, as lower NAs (<0.5) are used in these. Another description of a related technology is found in WO2012016753A1. The proposed approach comes closer to solving the requirements that has been seen in the above mentioned target applications, as it proposes a beam splitter located close to the imaging objective and hence reduces the relative optical path length drift in between the interferometer arms (see claim 5). The product and procedure described includes no means of suppressing reflexes from surfaces located close to the sample and is hence not suitable for high NA (>0.5) imaging of samples covered by glass. In these situations, the large signals induced by glass reflexes can overlap with signal from the sample, so that absolute definition of the sample position with <1 µm accuracy is not possible.

Figure 1:
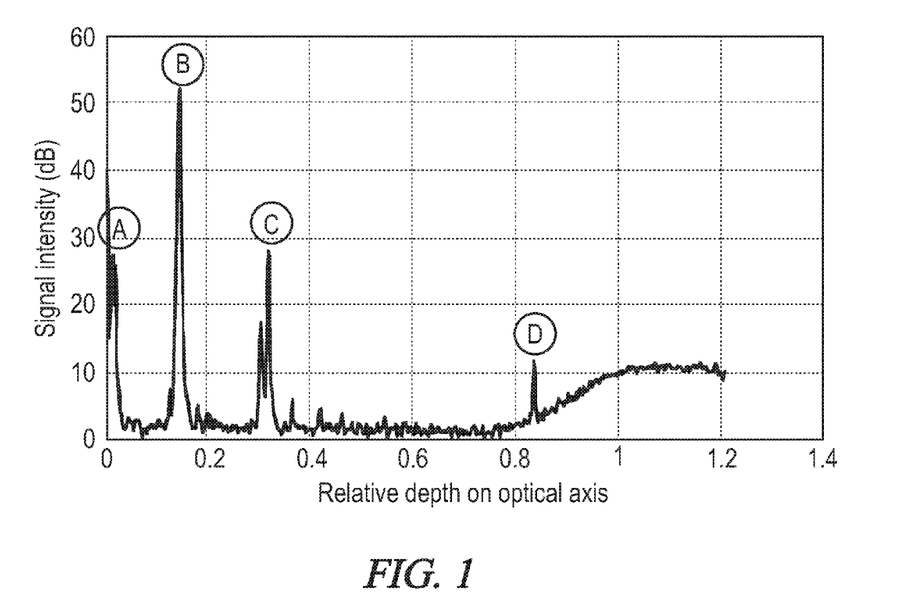
FIG. 1 shows a low coherence tomography signal from a sample arm centered to the imaging objective onto a sample that is embedded between a glass microscope slide and a cover slip.

FIG. 1 shows a low coherence interferometry signal derived from a microscopic setup using a Gaussian beam that is centered on the optical axis of an imaging microscope with a slide that holds a thin (~5 µm thick) histological sample. The sample is covered by a glass cover slip. The following features are visible:

Auto-interference (A) caused by spectral fringes created through interference from mainly the first surface of the cover slip (B) and adjacent reflexes from second surface of the cover slip and the slide glass (C). The back surface of the cover slip creates another signal peak (D).

The signal created by the sample is expected between the two peaks around position (C) and is superimposed by glass reflexes. A precise (<1 µm) determination of the sample position is not possible given such data set.

Therefore, there is a need for products and procedures that can solve the above problems.

An embodiment of the present invention proposes procedures for setting the illumination and detection aperture by ways of displacement from the optical axis while staying parallel to this axis. This is in principal different from the procedure suggested by Zeiss A G in WO2012016753A1, where an angled beam before the objective is used to create a parallel offset of the measurement beam with respect to the center optical axis. This approach is not capable of suppressing surface reflexes well enough to allow precise definition of sample location within <1 µm axial accuracy in thin (<10 µm thickness) samples that are placed underneath a microscope cover slip.

Furthermore, none of these two low coherence interferometry approaches discussed above suggest a solution for optimizing the signal when an imaging objective is changed.

An embodiment of the present invention provides a procedure that numerically compensates for offsets in the control loop that derive from use of arbitrary thickness material that is located in between imaging objective and sample material. No existing literature was found describing the compensation of refraction induced by material covering the sample.

Some embodiments of the present invention provide procedures for automatically calibrating the device for use of different imaging objectives. No existing literature was found describing such automatic calibration.

SUMMARY

Embodiments of the invention provide several technical approaches for of using low coherence interferometry techniques to create an autofocus apparatus for optical microscopy. An embodiment of the invention allows automatic focusing on thin structures that are positioned closely to reflective surfaces and behind refractive material like a cover slip. An embodiment of the invention allows automated adjustment of focus position into the sample region without disturbance from reflection off adjacent surfaces. The measurement offset induced by refraction of material that covers the sample is compensated for. An embodiment of the invention proposes techniques of an instrument that allows the automatic interchange of imaging objectives in a low coherence interferometry autofocus system. An embodiment of the invention is of major interest in combination with TDI (time delay integration) imaging, confocal and two-photon fluorescence microscopy.

One embodiment of the invention provides a microscopy system including: a low coherence interferometer; a beam splitter that transmits light to a microscope and reflects light from the low coherence interferometer into an optical path parallel to an optical axis of an imaging objective; wherein the imaging objective that focuses light from the low coherence interferometer into a sample material, the sample material being covered by a partially reflecting medium; wherein the low coherence interferometer is configured to have a detection aperture that is not coincident with an aperture that is defined by an area with a point symmetry of an illumination aperture, the point symmetry being an intercept of an optical axis of the imaging objective with an aperture plane; and wherein interferometer is configured to detect a portion of back-scattered light from the sample and exclude a substantial portion of light reflected from the partially reflecting medium.

Another embodiment of the invention provides a method for automatic relative focus adjustment of an autofocus microscopy system that comprises a low coherence interferometer and a beam splitter that transmits light to a microscope and reflects light from the low coherence interferometer into an optical path parallel to an optical axis of an imaging objective, wherein a sample is covered by a cover material, the method including: computing A-scan data of a relative air/cover material position; computing A-scan data of a relative sample position; calibrating a focus position; computing a thickness of the cover material; processing a motor set position; and commanding a movement of a motor unit; wherein if a signal back scattered from a sample is less than 10 dB above a noise floor, storing a last position corresponding to a signal back scattered from the sample that is greater than 10 dB; wherein if a signal back scattered from a sample is less than 10 dB above a noise floor, the last position is used for the processing.

Another embodiment of the invention provides a method for operating a microscopy system that includes a low coherence interferometer and a beam splitter that transmits light to a microscope and reflects light from the low coherence interferometer into an optical path parallel to an optical axis of an imaging objective, the method including: focusing light from the low coherence interferometer into a sample material by the imaging objective, the sample material being covered by a partially reflecting medium; providing to the low coherence interferometer a detection aperture that is not coincident with an aperture that is defined by an area with a point symmetry of an illumination aperture, the point symmetry being an intercept of an optical axis of the imaging objective with an aperture plane; and detecting a portion of back-scattered light from the sample and excluding a substantial portion of light reflected from the partially reflecting medium.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Time Delay Integration (TDI) is a well-known imaging technique that enables imaging of a moving sample by transferring charge across a CCD in a controlled manner. The challenge for autofocus, in the TDI application, is that the sample is always in motion. Traditional autofocus methods require taking a number of images at a common XY position by varying the focal plane and comparing quality metrics to determine the optimal focal point. Given the nature of TDI imaging of a constantly moving object in the X or Y direction, there is no ability to capture multiple images at a single point, therefore making traditional image-based autofocus methods unpractical. OCT based autofocus can provide a high speed, non-image based, feedback mechanism that corrects the focal position of the system while moving the sample.

An embodiment of the invention is of same interest in automated sample measurements like imaging of well plates, where two-photon-microscopy and laser scanning confocal microscopy are typically used.

In these applications, some refractive and relatively plano material is located in between imaging and objective, causing measurement errors in thickness using low coherence tomography, as well as being subject of signal distortions due to large reflections from the refractive surfaces overlapping with the signal derived from the sample material.

Glass Reflex Suppression

In order to enable low coherence interferometry to function in the proposed target application, the intensity of surface reflections that are close to the sample to be imaged need to be reduced with respect to the intensity detected from scattering of the sample.

Figure 2:
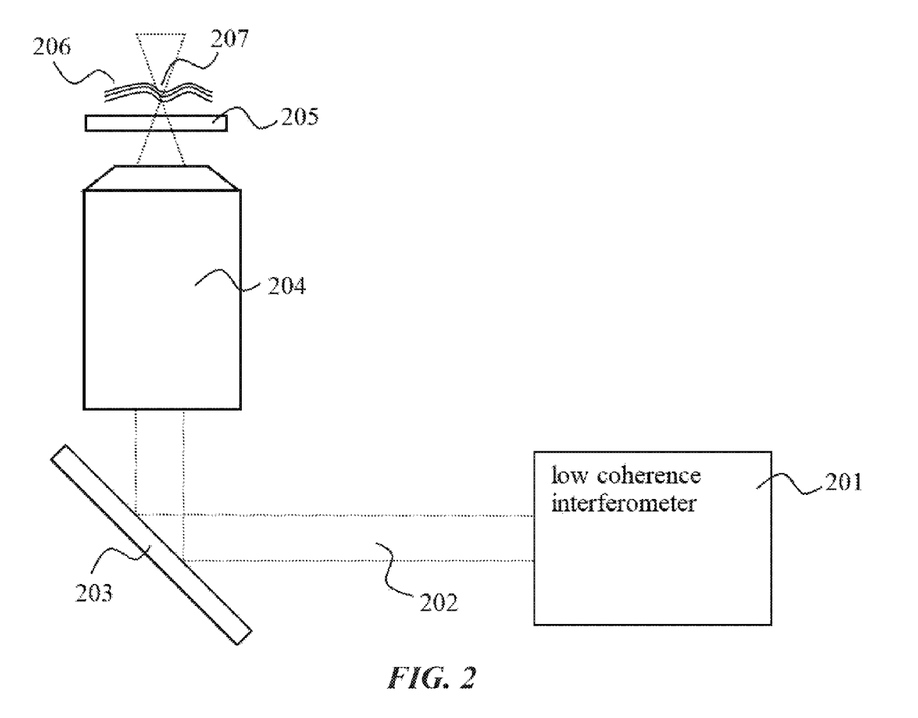
FIG. 2 illustrates a low coherence interferometer sample arm insertion into microscope objective and sample.

FIG. 2 depicts a low coherence interferometer (201) that can be designed in several ways targeting reflex suppression. The low coherence interferometer has sample arm light (202) that reaches into a microscope setup consisting of a mirror (203) that serves as a splitting device transmitting the imaging portion of the microscope (not depicted) and reflecting the light from the low coherence interferometer. In a similar fashion, the mirror could transmit the interferometer light and reflect the imaging light. An imaging objective (204) creates a focus (207) into the sample material (206), transmitting through reflecting medium (205). This reflecting medium can be a cover slip or microscope slide.

The microscope setup can be a TDI scanning device, a confocal scanning microscope, or a two-photon type fluorescence microscope.

The fundamental approach for reflex suppression makes use of the fact that signals created from plano reflexes are reflected into a known direction, while photons back-scattered by the sample material are scattered into multiple directions (approximately isotropic scattering).

Figure 3:
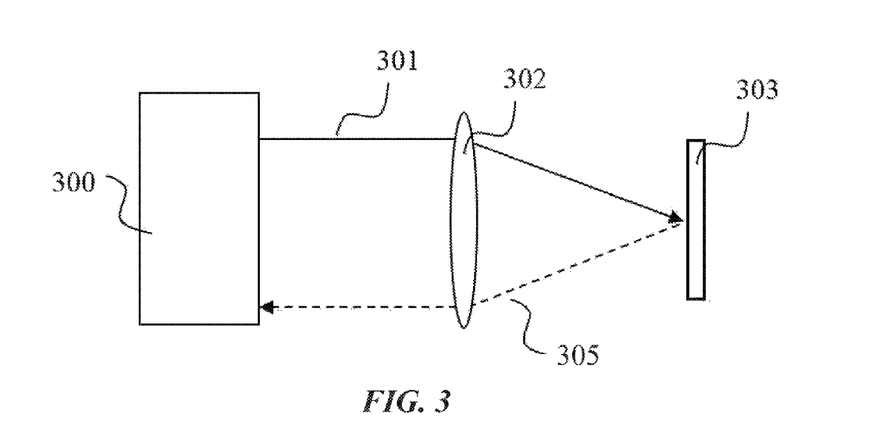
FIG. 3 illustrates a reflex off a plano surface.
Figure 4:
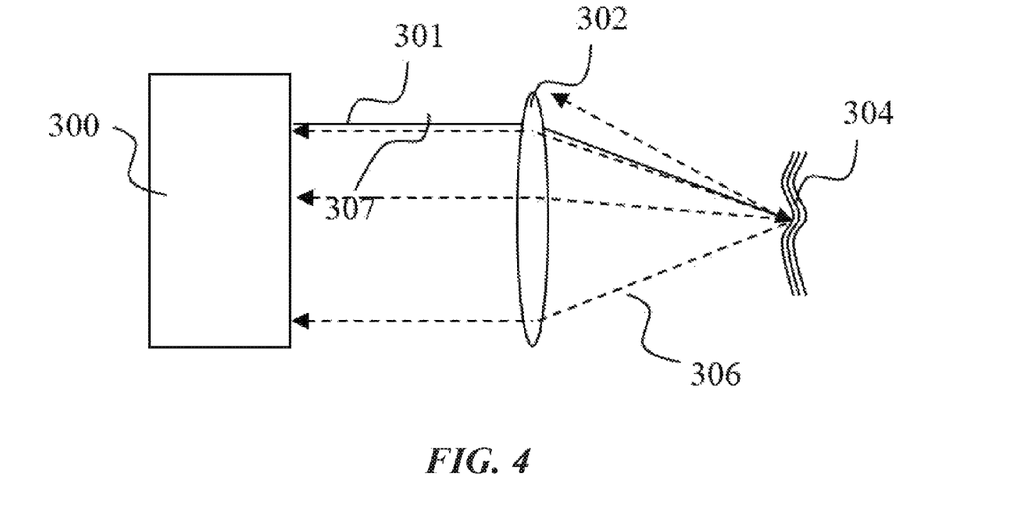
FIG. 4 illustrates a scattered signal off a non-plano sample.

In FIG. 3 and FIG. 4, an incident beam (301) from the low coherence tomography sample arm aperture (300) is focused by an imaging objective (302). In FIG. 3, the Fresnel reflex off a reflecting surface is shown. The location of the back-reflected beam (305) is offset to the incident beam (301). In opposition, as shown in FIG. 4, the back-scattered signal (306, all dotted lines) from a non-plano sample (304) is directed into multiple directions. Opposed to FIG. 3, a portion of the back-scattered light (307) in FIG. 4 coincides with the incident beam.

Embodiments of the invention provide ways to avoid that the detection aperture is coinciding with the aperture, that is defined by the area given with point-symmetry of the illumination aperture, where the symmetry point is defined by interception of the optical axis of the imaging objective with the aperture plane. Note that all known existing literature is describing such symmetry. In objection, the measurement beam can be set modified in various ways to suppress the detection of Fresnel reflexes from plano surfaces. The aperture of the low coherence interferometry setup can be designed in a fashion that allows for detection of a portion of the back-scattered light, while not detecting >90% of the reflected light.

FIG. 5 to FIG. 9 depict different approaches to reach this goal according to some embodiments of the invention. These sketches refer to the aperture as depicted in FIG. 3 and FIG. 4. The beams propagating substantially parallel to the optical axis of the imaging objective before being focused by this objective.

Figure 5:
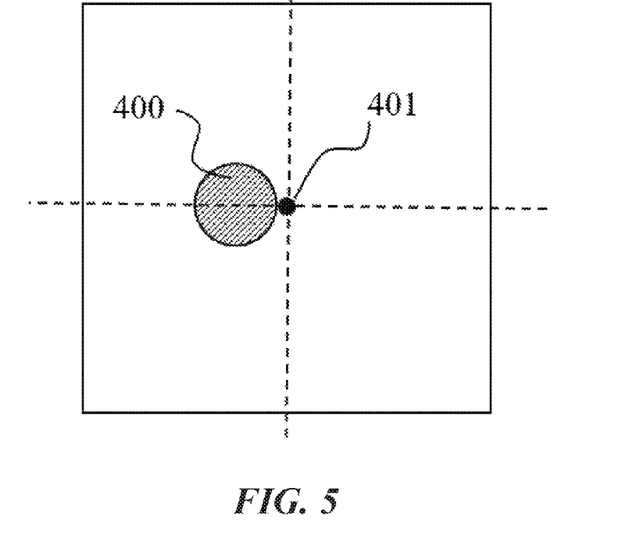
FIG. 5 illustrates a low coherence interferometry aperture with incident and detection aperture offset from the center axis of the imaging objective.

In FIG. 5, the illumination aperture (400) of the low coherence sample arm is significantly (>½ FWHM of the beam size) offset to the center of the optical axis (401). The detection aperture coincides with the illumination aperture (400).

Figure 6:
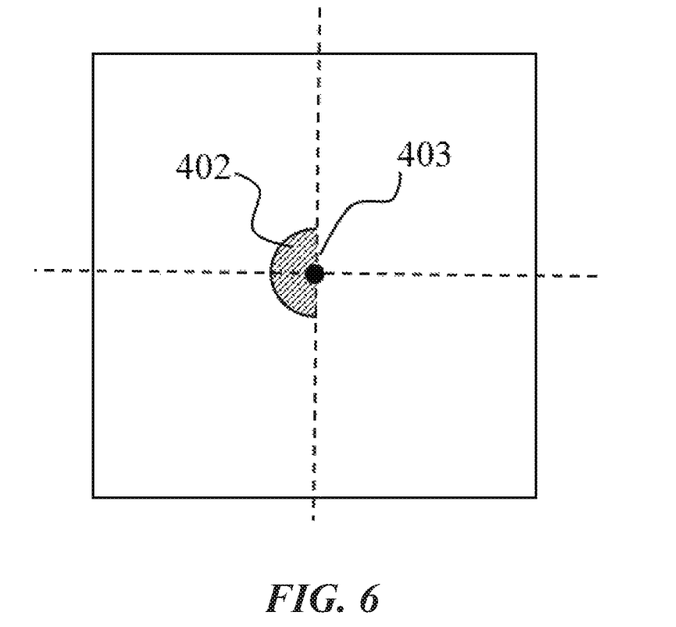
FIG. 6 illustrates a low coherence interferometry aperture with asymmetrical incident and detection apertures.

FIG. 6 depicts a scenario, where the coinciding illumination and detection apertures (402) are clipped to avoid point symmetry with the optical axis (403).

Figure 7:
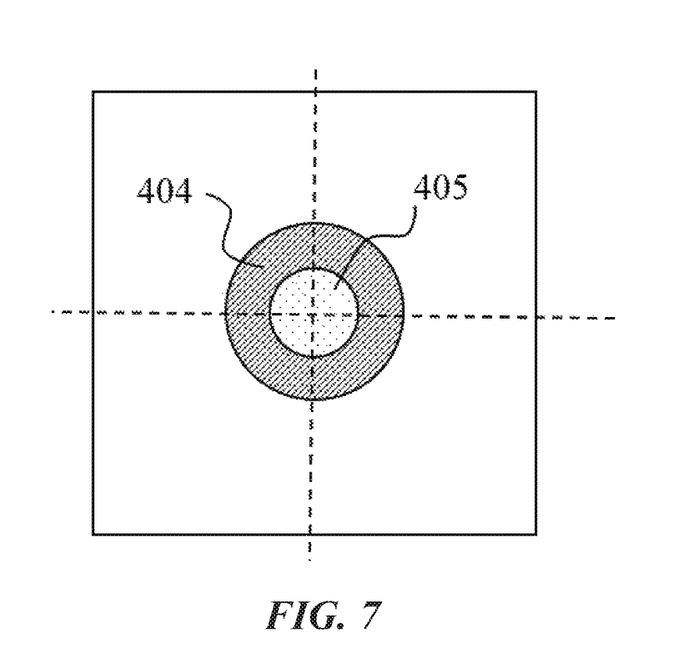
FIG. 7 illustrates a low coherence interferometry aperture with a ring-shaped detection aperture greater than the illumination aperture.

The problem can be solved equally by providing significantly different shapes of illumination (405) and detection (404) apertures, as shown in FIG. 7. The ring-shaped detection aperture (404) is greater than the illumination aperture (405). In this configuration, for instance a pierced mirror or an axicon can be used to reflect back-scattered light into the detection unit of the low coherence interferometer.

Figure 8:
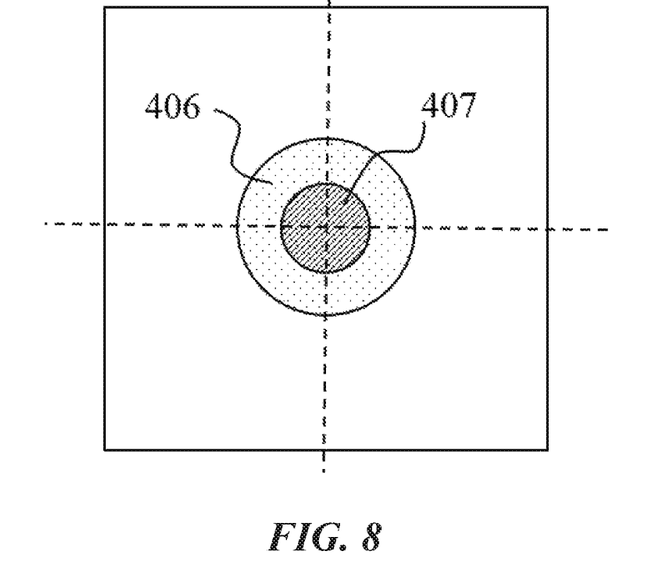
FIG. 8 illustrates a coherence interferometry aperture with a ring-shaped illumination aperture greater than the detection aperture.

FIG. 8 describes the reciprocal solution, where the illumination is shown as ring-shaped (406), while the detection (407) is having a maximum intensity in the center of the beam. The ring-shaped illumination aperture (406) is greater than the detection aperture (407).

Figure 9:
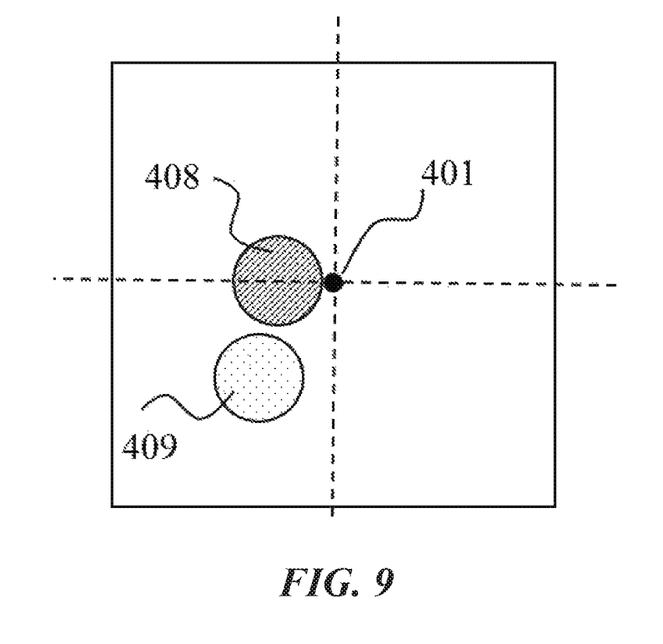
FIG. 9 illustrates a low coherence interferometry aperture with a detection aperture at an arbitrary position not coinciding with the point-symmetrical mirror image of the illumination aperture.

An arbitrary positioning, avoiding point-symmetry of illumination aperture (409) and detection aperture (408) with the optical axis (401) of the imaging objective is shown in FIG. 9.

Note that it is contemplated that these aperture setups can be combined, for instance, a clipped beam can be off-centered.

Figure 10:
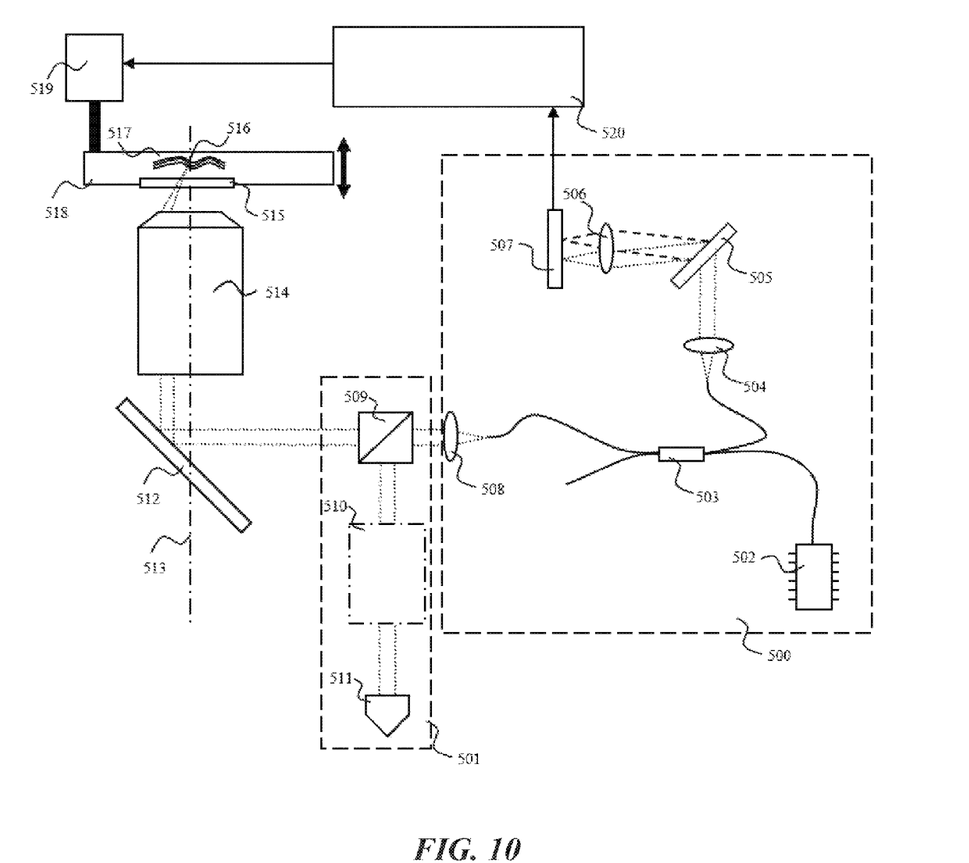
FIG. 10 illustrates an example setup of a microscopy system according to an embodiment.

An example configuration based on an aperture as described by FIG. 5 is shown in FIG. 10. Other configurations based on apertures of FIGS. 6-9 are similar.

The setup includes a low coherence tomography base unit (500) based on the principle of FD-OCT (Fourier Domain Optical Coherence Tomography). The setup proposed utilizes a broadband SLD (Superluminescent Diode, 502) that is fiber coupled with an optical coupler (503). The coupler might be replaced by an optical circulator in a similar fashion. Light from the SLD (502) is forwarded in fiber to a collimation objective (508), so that it enters the interferometer module (501) comprising a beam splitting device (509), a dispersion compensation glass (510) and a retro-reflecting device (511). The dispersion compensation glass can be used to partially compensate for dispersion in the imaging objective. It is not essential, as described below. The light path from beam splitting device (509) to retro-reflecting device (511) is referred to as "reference arm." Light back-reflected by the retro-reflecting device will pass the beam splitting device (509). The portion reflected by the beam splitting device (509) will enter the fiber optic coupler (503).

The portion of SLD light emitted from the fiber optic coupler (503) enters the imaging path parallel to the optical axis (513) over a partially reflective mirror (512). This partially reflective mirror needs to have a uniformly continuous phase distribution of the reflected light over the spectral range covered by the light source. Preferably, this mirror reflects the larger portion of the incident SLD light and transmits the larger portion of the light used for optical microscopy. As depicted, the SLD light is severely offset to the optical axis of the imaging objective (514). Due to this offset, the beam propagating towards the focus (516) is angled with respect to the optical axis; this angle needs to exceed all possible angles of the reflecting surface towards the optical axis of the objective. In this configuration, the SLD beam passes through partially reflective surfaces (515) into scattering sample material (517). A portion of the light that is back-scattered from this sample material (517) coincides with the illuminating SLD beam and travels back into the fiber optic coupler (503).

A portion of this back-scattered light, a small portion of the light back-reflected by surfaces (515) and a portion of the light back-reflected in the reference arm (501) propagate into a spectrometer formed by a collimator (504), a grating (505), a focus optic (506) and a linear sensor (507). The spectrum detected by the sensor (507) is processed in a processing unit (520). The processing includes a Fourier Transform. It determines the relative optical path length from beam splitting device (509) to retro-reflecting device (511) with the optical path length from beam splitting device (509) to scattering medium (517) by analysis of the special frequency on the sensor (507). The processing unit (520) determines the offset of this relative optical path length versus a calibrated focus set path length and drives a motor unit (519), so that the sample holder (518) moves the sample material (517) into the focus of the objective (516).

Figure 11:
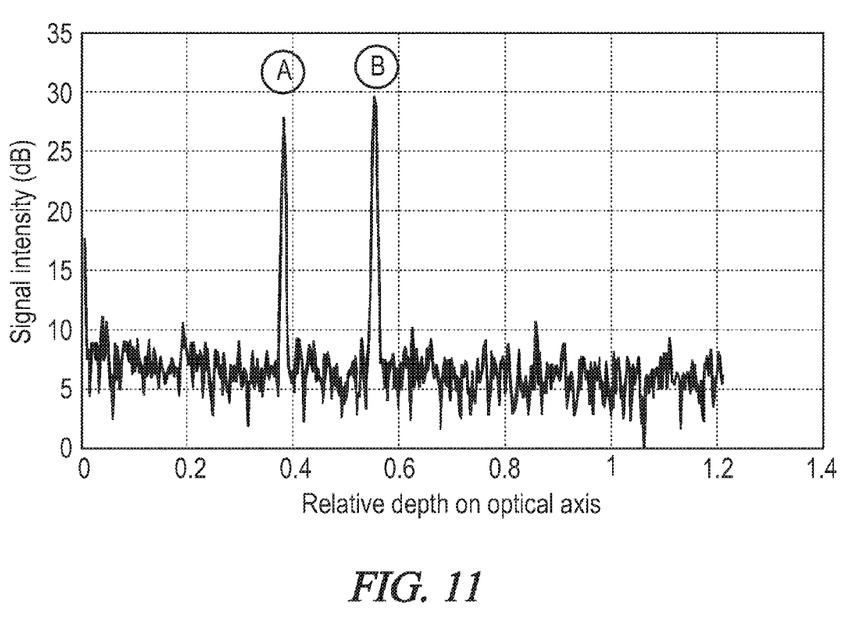
FIG. 11 shows a low coherence tomography signal from a sample arm de-centered to the imaging objective onto a sample that is embedded between a glass microscope slide and a cover slip.
Figure 12:
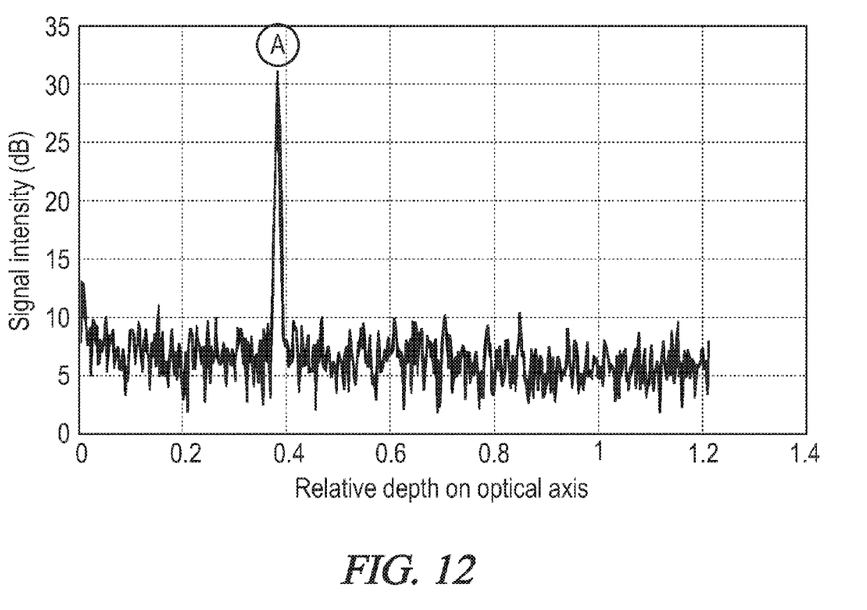
FIG. 12 shows a low coherence tomography signal as in FIG. 9, but without back-scattering material being present.

FIG. 11 shows a calibrated fast Fourier Transform (FFT) signal after computation ("A-scan") from a setup as shown in FIG. 10. The signal is taken from a thin (5 μm) mouse brain slice that is placed between a microscope slide glass and a glass cover slip. It shows the depth dependent signal strength of scattered and reflected signals. In opposition to FIG. 1, which shows a signal with a measurement beam centric and symmetrical to the objective optical axis, the signals from cover slip and slide are reduced by approximately −25 dB, so that only signal from the interface air to cover slip (A) is detected above the measurement system noise floor. The signal from the scattering sample (B) is well preserved. At a place on the sample, where the measurement beam does not hit the scattering sample medium, as shown in FIG. 12, only the air/cover slip signal remains.

In a preferred embodiment, both the air/cover slip signal (A) and the sample signal (B) are determined.

Figure 13:
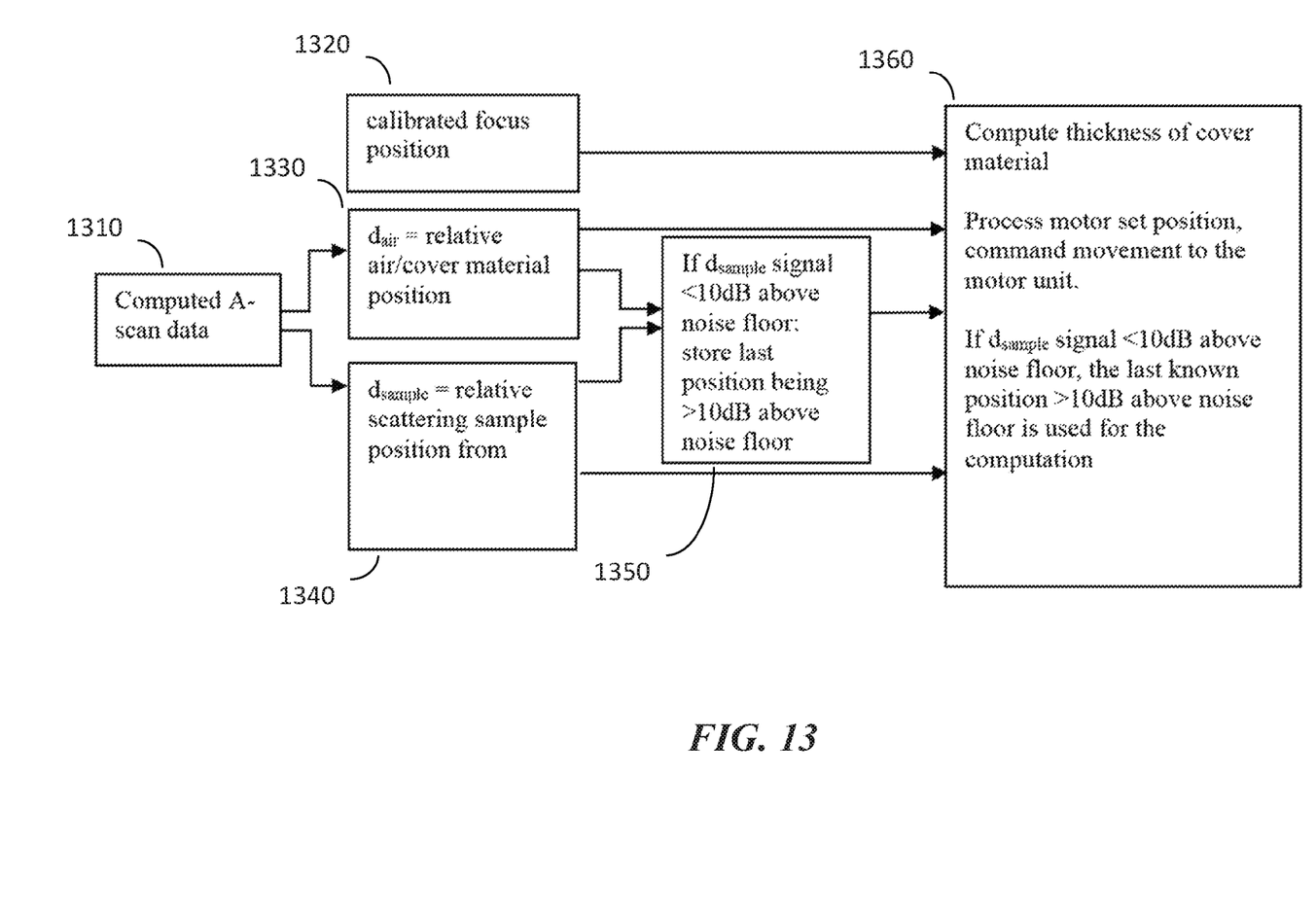
FIG. 13 illustrates a signal processing and autofocus procedure according to an embodiment.

A stable procedure for computing the FFT signal derived from the spectrometer data towards an automatic relative focus adjustment is depicted in FIG. 13. In (1310), the A-scan data for both the air/cover slip signal (A) and the sample signal (B) are computed. The $d_{air}$=relative air/cover material position is determined in (1330), and the $d_{sample}$=relative scattering sample position is determined in (1340). In (1350), if the $d_{sample}$ signal is less than 10 dB above the noise floor, the last position having a $d_{sample}$ signal greater than 10 dB above the noise floor is stored. In (1320), focus position is calibrated. In (1360), the thickness of the cover material is computed; the motor set position is processed for commanding the motor unit to move the sample holder; and if $d_{sample}$ signal is less than 10 dB above the noise floor, the last known position having a $d_{sample}$ signal greater than 10 dB above the noise floor is used for the computation. Especially in TDI scanning microscopy applications, the cover slides that are imaged by the objective should not hold sample material at all times, while it is beneficial to hold the focus into the area of interest as good as possible. The procedure locks the position of the sample into the focus of the objective and records the known distance to the first glass reflex ((A) in FIG. 11), so that when the sample is not present, the autofocus routine stays active and tracks the last known position of the sample relative to the first air/glass reflex.

The calibrated focus position may be manually calibrated by adjusting into the focus (while observing the image through the objective), or by an automated procedure that maximizes the contrast of the image observed by the imaging system.

The imaging device according to an embodiment is able to maintain focus on imaging scenarios, where the thickness of a covering refractive material—like a microscope cover slip—is measured, and the control algorithm is able to adjust the autofocus control signals according to that measurement. Two underlying effects are to be taken into account for this procedure:

a) The relative distance measurement performed by low coherence interferometry is not directly measuring physical distance $\Delta d_{phys}$ of a refractive medium that is located in between imaging objective and sample, but the optical thickness $\Delta d_{A-scan}$ by means of physical thickness $\Delta d_{phys}$ multiplied by the group refractive index $n_{group}$ of the material that the measurement beam propagates through.

$$\Delta d_{A-scan} = n_{group} \cdot \Delta d_{phys}$$

b) The physical focus position of the imaging system is elongated by refractive material that is located in between imaging objective and sample (given that it is flat) with the following relationship:

$$\Delta d_{focus} = \Delta d_{phys} \cdot \left(1 - \frac{1}{n}\right)$$

Snell's law of refraction applies in measurement aperture and sample situations that cause the measurement beam to be angled with respect to the focus adjustment axis, which in the usual case should coincide with the optical axis of the objective.

Given these relationships, a virtual set point for the autofocus procedure can be derived that is independent of the thickness of the refractive medium located between sample and objective.

Solutions for Objective Interchangeability

In order to enable the autofocus setup to accommodate interchangeable objectives without the need of manual adjustment to the interferometer, an automated reference length adjustment is provided according to an embodiment. This can be implemented by:

a. Motorization of the reference retro-reflecting device, so that the reference path length can be adjusted to compensate for the optical path length differences in different objectives.

b. Interchanging a dispersion compensating glass plate, matching the differences in optical path length through different objectives.

c. Shifting prism elements located inside the interferometer module along their symmetry axis.

In a preferred embodiment, the path length of the reference path is adjusted without exact compensation of the dispersion given by the objective in the sample arm path. In this embodiment, the dispersion is compensated numerically. The advantage of this approach is that it is universal and insensitive to batch-wise changes of optical path length in objectives.

In an embodiment, dispersion mismatch between reference arm and sample arm as introduced by an objective can also be compensated numerically. The advantage is that an arbitrary number of calibrations can be stored in software and used whenever needed, and new objectives can be taken into account. Also this approach is simple and numerically stable, in general yielding good results.

The spectrum S(k) that was acquired in the presence of group velocity dispersion mismatch between reference and sample arm can be corrected by multiplying it with a phase factor $$S_{corr}(k)=\exp(i\varnothing(k))S(k)$$

with suitable phase function φ(k) yielding the corrected spectrum $S_{corr}(k)$. Constant and linear terms of φ(k) do not change the correction, but shift the entire position of the signal. In most cases the phase function can be approximated by a quadratic function $$\varnothing(k)=A(k-k_0)^2$$

with $k_0$ being the central wavelength and reducing the correction to a single free parameter A depending on the dispersion mismatch.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A microscopy system comprising:
a light source;
a detector;
an optical element that directs light from different paths into an optical path parallel to an optical axis of an imaging objective;
wherein the imaging objective focuses light from the light source into a sample, the sample being covered by a partially reflecting medium;
wherein the detector is configured to have a detection aperture that is not coincident with an aperture that is defined by an area with a point symmetry of an illumination aperture, the point symmetry being an intercept of the optical axis of the imaging objective with an aperture plane; and
wherein the detector is configured to detect a portion of back-scattered light from the sample and exclude a substantial portion of light reflected from the partially reflecting medium.

2. The system of claim 1, wherein the illumination aperture is at least half FWHM (full width at half maximum) offset to a center of the optical axis and the detection aperture coincides with the illumination aperture.

3. The system of claim 1, wherein the illumination and detection apertures are coincident and are clipped to avoid point symmetry with the optical axis.

4. The system of claim 1, wherein the detection aperture is ring-shaped and is greater than the illumination aperture.

5. The system of claim 1, wherein the illumination aperture is ring-shaped and is greater than the detection aperture.

6. The system of claim 1, wherein the detection aperture is at an arbitrary position not coinciding with a point-symmetrical mirror image of the illumination aperture.

7. The system of claim 1, wherein the light source is fiber coupled with an optical coupler, and light from the light source is forwarded in a fiber to a collimation objective, so that the light enters an interferometer module comprising
a beam splitting device; and
a retro-reflecting device;
wherein a portion of the light is reflected by beam splitting device to the retro-reflecting device, back-reflected by the retro-reflecting device to the beam splitting device and then reflected by the by beam splitting device to a fiber optic coupler, a light path from the beam splitting device to the retro-reflecting device forming a reference arm;
wherein another portion of the light enters the imaging path over the partially reflective mirror through the imaging objective, passes through a partially reflective surface in a sample;
wherein back-scattered light from the sample, a portion of light back-reflected by the partially reflective surface and a portion of a portion of the light back-reflected in the reference arm propagate into a spectrometer comprising a collimator, a grating, a focus optic and a linear sensor;
wherein a spectrum detected by the sensor is processed in a processing unit which determines a relative optical path length from the beam splitting device to the retro-reflecting device with an optical path length from the beam splitting device to the sample by analysis of the special frequency on the sensor, and the processing unit determines an offset of the relative optical path length based on a calibrated focus set path length and drives a motor unit to move a sample holder so that the sample on the sample holder is brought into the focus of the imaging objective.

8. The system of claim 7, wherein the imaging objective is interchangeable, and the retro-reflecting device is motorized, so that the reference path length can be adjusted to compensate for optical path length differences in different objectives.

9. The system of claim 7, wherein the imaging objective is interchangeable, and the system further comprises an interchangeable dispersion compensating glass plate that matches optical path length differences in different objectives.

10. The system of claim 7, wherein the imaging objective is interchangeable, and the interferometer module comprises prism elements that are adjusted along their symmetry axis to match optical path length differences in different objectives.

11. The system of claim 7, wherein the imaging objective is interchangeable, and the system is configured to compensate path length differences in different objectives numerically.

12. The system of claim 11, wherein compensation data for path length differences in different objectives are stored in the processing unit.

13. A method of imaging a sample that is covered by a partially reflecting medium, the method comprising:
directing light from different paths into an optical path parallel to an optical axis of an imaging objective;

focusing light into a sample by the imaging objective;
providing to a detector a detection aperture that is not coincident with an aperture that is defined by an area with a point symmetry of an illumination aperture, the point symmetry being an intercept of the optical axis of the imaging objective with an aperture plane; and
detecting a portion of back-scattered light from the sample and excluding a substantial portion of light reflected from the partially reflecting medium.

14. The method of claim 13, wherein the illumination aperture is at least half FWHM (full width at half maximum) offset to the center of the optical axis and the detection aperture coincides with the illumination aperture.

15. The method of claim 13, wherein the illumination and detection apertures are coincident and are clipped to avoid point symmetry with the optical axis.

16. The method of claim 13, wherein the detection aperture is ring-shaped and is greater than the illumination aperture.

17. The method of claim 13, wherein the illumination aperture is ring-shaped and is greater than the detection aperture.

18. The method of claim 13, wherein the detection aperture is at an arbitrary position not coinciding with a point-symmetrical mirror image of the illumination aperture.

* * * * *